Nov. 20, 1951     M. E. HICKEY     2,575,661
MEDICAL THERAPY CART

Filed Jan. 20, 1950     2 SHEETS—SHEET 1

Marie E. Hickey
INVENTOR.

Nov. 20, 1951 M. E. HICKEY 2,575,661
MEDICAL THERAPY CART
Filed Jan. 20, 1950 2 SHEETS—SHEET 2

Marie E. Hickey
INVENTOR.

Patented Nov. 20, 1951

2,575,661

UNITED STATES PATENT OFFICE 2,575,661

MEDICAL THERAPY CART

Marie E. Hickey, East Chicago, Ind., assignor of fifty per cent to Anne E. Kass, Mauston, Wis.

Application January 20, 1950, Serial No. 139,743

1 Claim. (Cl. 211—1)

The present invention relates to new and useful improvements in carts for use in hospitals for the convenient transportation of various forms of medications for administering to the patients in different rooms or wards of the hospital.

An important object of the invention is to provide a cart of this character in the top of which containers for the medications are carried in an easily accessible sanitary condition with means adjacent each container for holding an identification card containing individual instructions for the administration of the medication to each patient and also providing a card rack at the back of the tray for holding the identification cards after each administration has been completed.

A further object of the invention is to provide a hospital service cart of this character constructed to support a tray in the top of the cart on which the various medicinal containers rest and providing a cover on top of the cart supported above the tray and having openings through which the containers project to keep the containers separated from each other and in an easily accessible position and to further removably support the tray and cover on the cart for effectively cleaning the same.

A still further object is to provide a device of this character of simple and practical construction, which is efficient and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
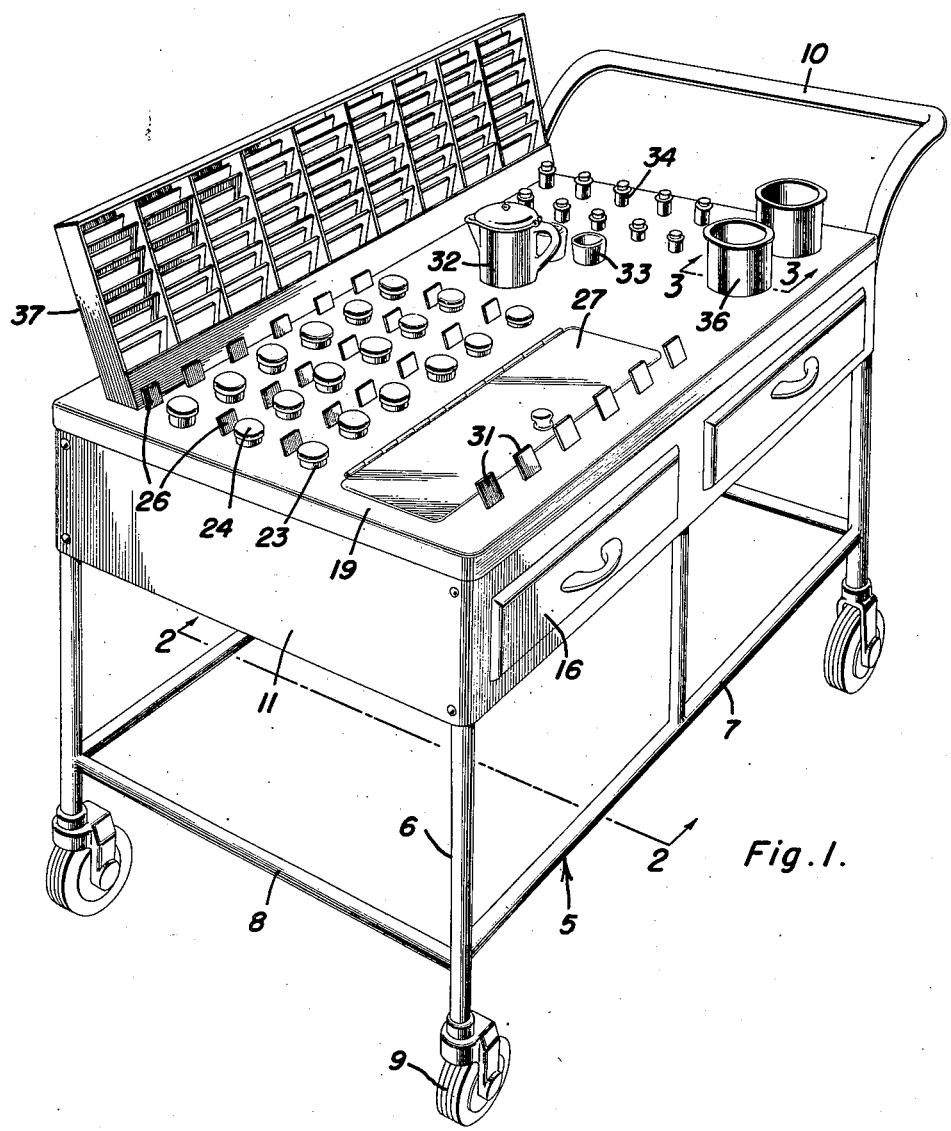
Figure 1 is a perspective view.

Referring now to the drawings in detail, wherein, for the purpose of illustration, I have disclosed a preferred embodiment of the invention, the numeral 5 designates the cart generally and is constructed to provide legs 6 at each corner of the cart, side rails 7, and end rails 8, all preferably constructed of tubular metal and welded or otherwise rigidly connected to each other to form a frame for the cart. Rubber tired wheels or rollers 9 are journaled at the lower ends of the legs 6 and a handle 10 is inclined upwardly and outwardly from the upper ends of the legs 6 at one end of the cart.

Figure 2:
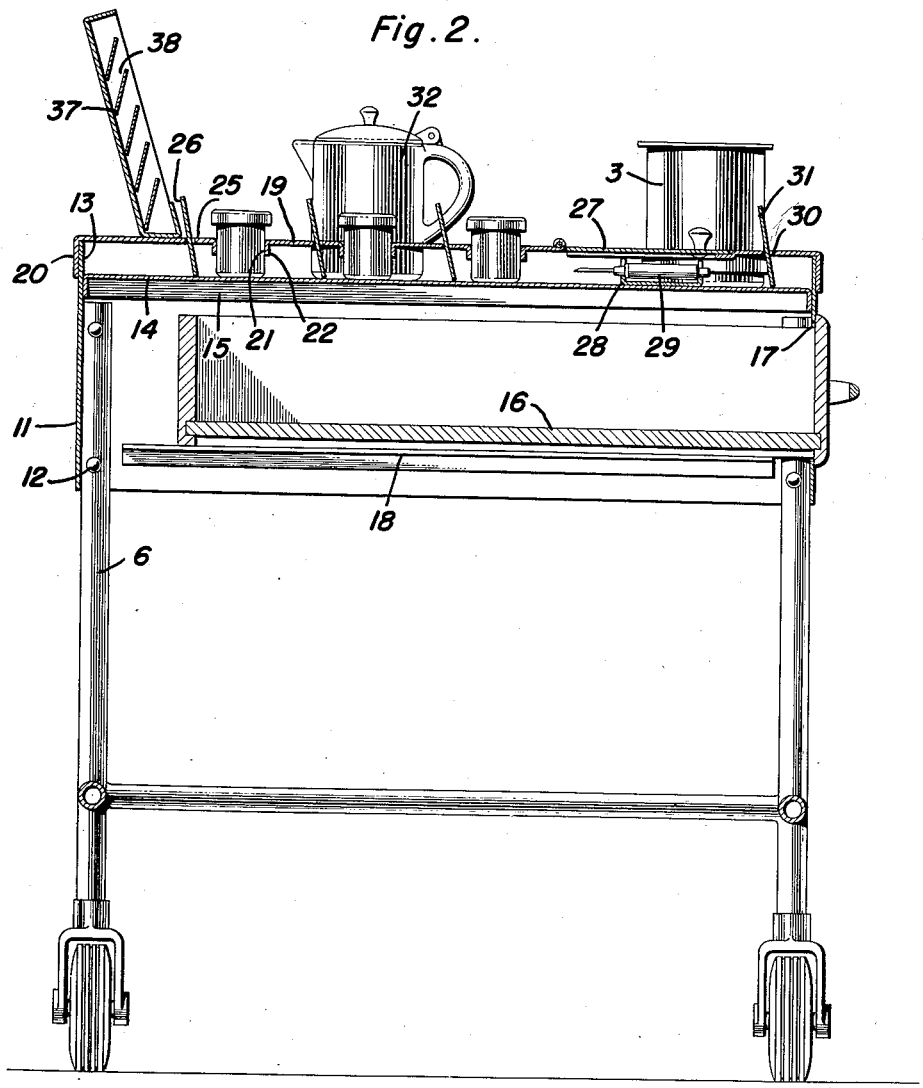
Figure 2 is an enlarged transverse sectional view taken on a line 2—2 of Figure 1.
Figure 3:
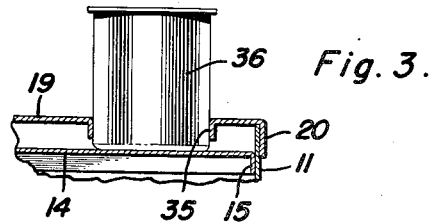
Figure 3 is an enlarged fragmentary sectional view showing the supporting means for one of the receptacles and taken on the line 3—3 of Figure 1.

A continuous sheet metal panel 11 extends around the upper portion of the cart outwardly of the legs 6 and is secured to the upper ends of the legs by rivets or the like 12 and with the upper edge of the panel 11 projecting upwardly above the upper ends of the legs, as shown in Figure 2 of the drawings, to provide a continuous upstanding wall 13.

A shelf 14 also of metal is formed with downwardly extending flanges 15 at its edges and is positioned inside the wall 13 with the flange 15 resting on the top of the legs 6 to removably support the shelf in position.

Drawers 16 are slidable through openings 17 in the front of panel 11 and are supported on rails 18 welded or otherwise suitably secured to the inside of the panel.

A cover 19 is removably supported on the upper edge of wall 13, the cover likewise being constructed of metal and formed at its edges with a downturned flange 20 positioned outwardly of wall 13. Cover 19 is removably supported on the upper edge of wall 13 in spaced relation above shelf 14.

The cover 19 is formed with a plurality of openings 21 having downwardly extending flanges 22, a group of the openings being arranged adjacent one side of cover 19 and of a size for snugly receiving medicine glasses 23 having metal covers 24 so that the bottom of the glasses rest on the shelf 14 and the tops of the glasses project above cover 19. Slots 25 are formed in the cover 19 immediately behind each glass 23 for receiving identification cards 26 which also rest on shelf 14 and project upwardly above the cover. The cards may contain suitable instructions or data for the information of a nurse or attendant administering the contents of the glasses 23 to a designated patient. Immediately in front of the group of medicine glasses 23 is a hinged door 27 under which is a rack 28 supported on shelf 14 for holding a plurality of syringes 29 and slots 30 are formed in cover 19 in front of door 27 and aligned with the respective syringes 29 for also holding identification or instruction cards 31 which rest on the shelf 14 and project upwardly above the cover 19.

A water pitcher 32 and glasses 33 are also supported in a group of the openings 21 adjacent the center of the cover 19 and a group of vials 34, or other types of medicine containers are placed in a group of the openings 21 in cover 19 adjacent handle 10, the vials 34 likewise resting on shelf 14 and projecting upwardly above the cover.

Larger openings 35 may also be formed in cover 19 for holding receptacles 36 which may contain an alcohol sponge, forceps or the like.

A card rack 37 is supported in a rearwardly inclined position adjacent the rear edge of cover 19 and provided with individual pockets 38 in which the cards 26 and 31 are placed after the medicine or treatment has been administered to the patient and which may thus be used as a check to show that each patient has been treated.

It will be apparent from the foregoing that medicine necessary for the treatment of a large number of patients may be conveniently carried in the cart and the cart moved from room to room to save time and effort in administering to the patients.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A medical therapy device comprising a frame including four supporting legs, a continuous sheet metal panel extending around the upper portions of the legs, said panel being secured to said legs and including an upper edge extending upwardly above the upper ends of the legs to form a continuous upstanding wall, a shelf positioned inside the wall and including a depending peripheral flange resting on top of the legs to removably support the shelf in position, a cover removably supported on the upper edge of the panel and including a downturned peripheral flange overlapping the outer side of the wall forming portion of the panel, said cover having a plurality of article receiving openings therein with the edges defining the openings extending downwardly to form flanges adapted to surround articles placed in the openings, and said cover also having a plurality of card receiving slots, there being one slot behind each opening adapted to receive a card for indicating the article in the opening it is disposed behind.

MARIE E. HICKEY.

REFERENCES CITED

The following references are of record in the file of this patent:

UNITED STATES PATENTS

| Number | Name | Date |
|---|---|---|
| D. 154,913 | Fay | Aug. 23, 1949 |
| 386,783 | Johnson et al. | July 24, 1888 |
| 602,738 | Finotti | Apr. 19, 1898 |
| 809,854 | Sochurek, Sr. | Jan. 9, 1906 |
| 1,474,753 | Zrebiec | Nov. 20, 1923 |
| 1,505,299 | Stirn | Aug. 19, 1924 |
| 1,529,968 | Taylor | Mar. 17, 1925 |
| 1,640,971 | Widen | Aug. 30, 1927 |
| 1,688,888 | Spreen | Oct. 23, 1928 |
| 1,985,412 | Jackson | Dec. 25, 1934 |
| 2,177,153 | Ross et al. | Oct. 24, 1939 |
| 2,558,955 | Hilton | July 3, 1951 |